May 25, 1954   J. MARTINSON   2,679,131
TRACTOR MOUNTED HAY RAKE
Filed Oct. 25, 1951   2 Sheets-Sheet 1
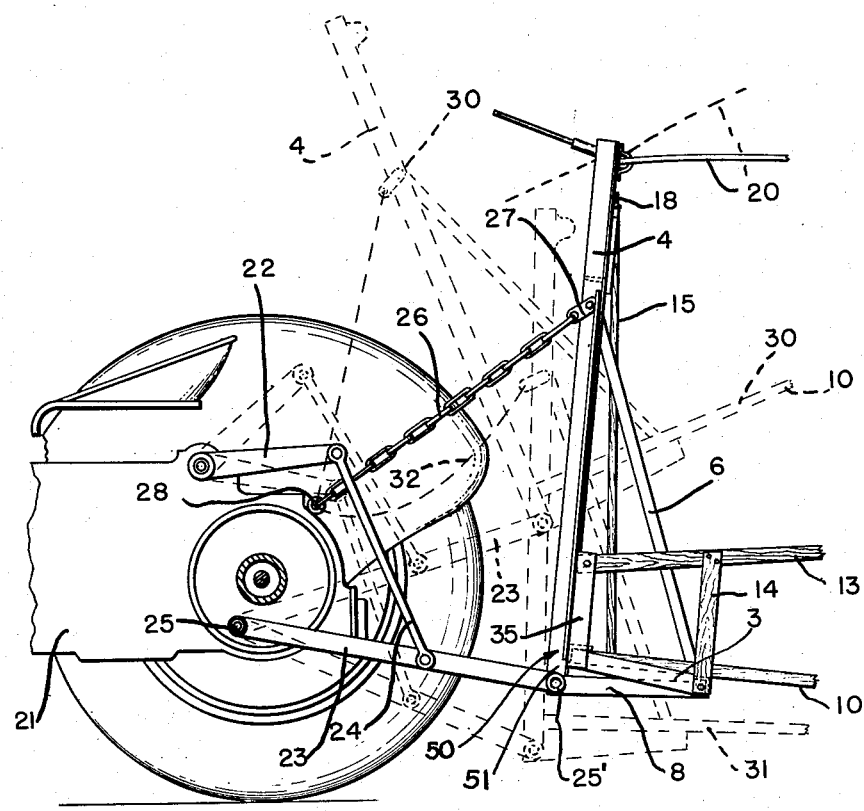
FIG. I
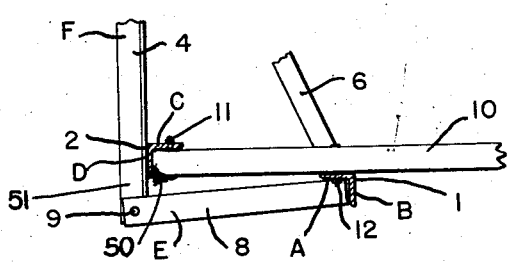
FIG. 2
*INVENTOR.*
JOHN MARTINSON
BY
*Richard P. Cardew*
AGENT May 25, 1954     J. MARTINSON     2,679,131
TRACTOR MOUNTED HAY RAKE
Filed Oct. 25, 1951     2 Sheets-Sheet 2
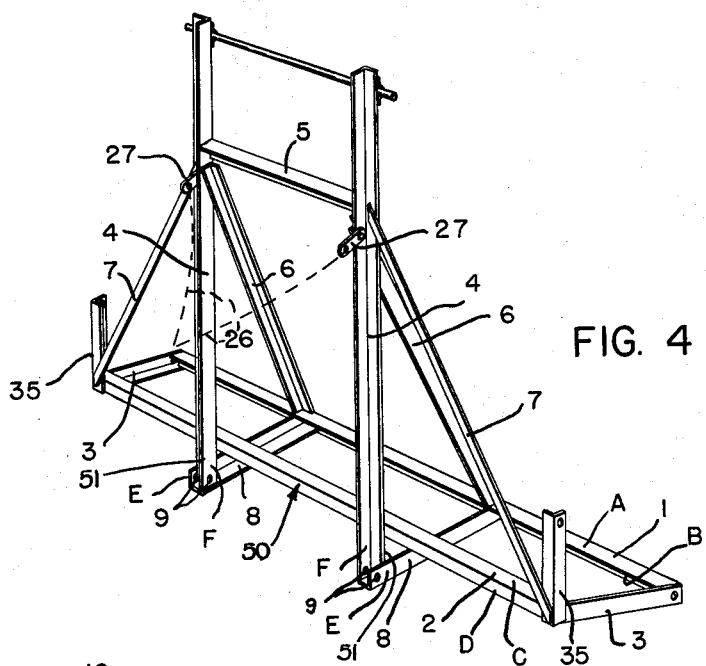
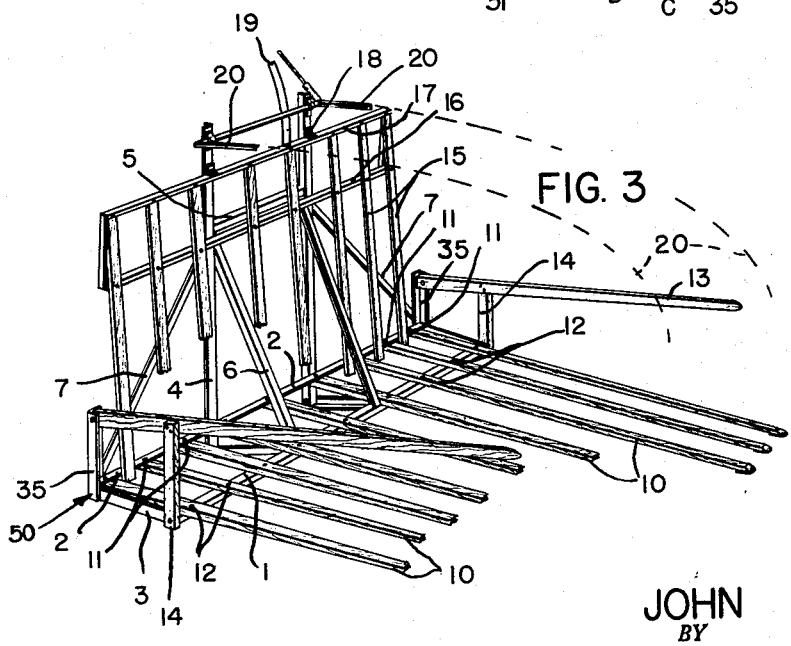
INVENTOR.
JOHN MARTINSON
BY
Richard P. Cardew
AGENT Patented May 25, 1954

2,679,131

UNITED STATES PATENT OFFICE 2,679,131

TRACTOR MOUNTED HAY RAKE

John Martinson, Wrenshall, Minn.

Application October 25, 1951, Serial No. 253,175

3 Claims. (Cl. 56—27)

This invention relates to farming equipment and has special reference to a hay bucker.

One of the principal objects of my invention is to provide a hay bucker which may be easily and conveniently attached to the conventional hydraulic lift controls on farm tractors, to be conveniently operated and controlled by the latter.

Conventional hydraulic lift controls are usually located on the rear portion of a farm tractor; therefore, it is another object of my invention to provide a hay bucker which may be carried at the rear end of a tractor and may be operated to pick up or rake hay and the like while the tractor is traveling in a rearward or reverse direction.

Another object is to so mount the hay bucker on the tractor that it may be held in various adjusted positions with relation to the ground to permit operation on various types of terrain, such as hilly, flat, or rough fields, and whereby the position of the bucker may be adjusted quickly and easily by the tractor driver should some unusual terrain be encountered.

Another object is to provide a hay bucker which is of light weight, yet simple and sturdy construction, whereby it may be made and sold inexpensively and having a capacity whereby a good quantity of hay or the like may be picked up in one operation.

Another object is to provide an improved, simple frame or chassis for a hay bucker and an improved means for mounting rake teeth for such a device.

Another object is to provide a hay bucker which may be raised above the ground with the rake teeth thereof inclined sufficiently to prevent hay or other material carried thereby from falling off or out of the bucker as the tractor is driven forwardly to transport a load to a point of unloading or deposit, such as a hay stack, or a barn.

Another object is to provide a rear, substantially vertically disposed wall which acts as a stop for the hay as the bucker is moved along the ground with the outer ends of the rake teeth in engagement with the ground, so that the hay will be accumulated at the rear wall of the device, and whereby the hay will be carried in a substantially V-shaped trough when the bucker is in elevated carrying or transporting position.

Another object is to provide a pivotal fence as a portion of the above mentioned back wall which will facilitate the unloading of hay or the like at the unloading point.

These and other objects and advantages of my invention will become more apparent as the description proceeds.

In the accompanying drawing forming a part of this application:

Figure 1 is a longitudinal sectional view through a conventional farm tractor between the wheel and frame thereof showing the invention mounted in operating position thereon and the connection of the invention to the tractor to be operated as desired by the power lift, the dotted lines indicating various adjusted positions of the invention.

Figure 2 is a fragmental substantially central vertical sectional view of the bucker chassis showing the mounting of the teeth.

Figure 3 is a perspective view of the bucker alone with parts broken away.

Figure 4 is a perspective view of the metal chassis for the bucker.

In the drawing, the reference numeral 1 indicates the forward base member of the chassis 50 of my device. The base member preferably comprises a length of angle iron having the upper one A of its sides extending rearwardly from the juncture of the sides, and the other one B facing downwardly, as shown. The rear base member 2 of the chassis is also of angle iron and extends in spaced parallel relation to the forward base member 1; however, the upper one C of the sides of the rear chassis base member extends forwardly, while the other one D extends downwardly as shown. It is also to be noted that the upper faces A and C of the angle irons are disposed in parallel planes; however, the rear base member 2 is spaced above the forward base member 2 the thickness of the rake teeth 3, the reason for which will become apparent.

The members 1 and 2 are joined at their adjacent ends by an angle iron frame member 3, 3 which is disposed at an angle to the plane of the upper faces A and C of the members 1 and 2 so that a neat appearance and fully welded juncture may be obtained.

The base of my device comprises the members 1, 2, and 3, 3.

The rear frame or chassis section of my device comprises a pair of vertically disposed angle irons 4, 4 which are welded, or otherwise secured, to the member 2 in spaced relation to each other and to the ends of the base, the members 4, 4 having a portion thereof extending slightly below the member 2 as shown forming mounting extensions 51, 51 below the plane of the base of the chassis. The rear frame extends materially above the base as shown. The rear frame is provided with a plurality of stabilizers or braces, one of which is the angle iron 5 welded in place transversely between the members 4 as shown. A pair of braces 5, 6 are provided which are welded to and extend in angular relation between the members 4, 4 and the forward base member 1 of the base, as shown, to provide longitudinal stability for the frame. A pair of strap iron braces 7, 7 are provided between each of the members 4 and the adjacent outer corner of the base to provide lateral stability.

An additional brace or skid member 8 is provided between the lower end of each of the extension members 51, 51 and the front member 1 of the chassis, the skid being preferably of angle iron as shown, and being disposed with one side E thereof in spaced parallel relation to the side F of the adjacent member 4, as shown, whereby alined holes 9—9 may be made at the lower ends of the members 51, 51 in the sides E and F, as shown, to provide means to mount the hay bucker on a tractor, as shown.

The rake teeth 10 of my device comprise elongated wooden members which are preferably tapered from their rear toward their forward ends. A plurality of teeth are mounted on the chassis in substantially equally-spaced parallel relation to each other to form a combined hay pick-up and holder for the bucker. The teeth 10 are materially longer than the distance between the front and rear chassis members 1 and 2, as shown, and the teeth are so mounted as to extend materially forwardly of the member 1.

The teeth 10 are mounted in the particular manner here shown to provide strength and durability as well as to permit the teeth to flex somewhat when necessary while passing along the ground during the operation of the device to prevent breakage of the teeth. In addition, the teeth are so mounted as to permit the quick and easy replacement of a tooth if broken during operation to minimize the loss of time in making the repair.

The said mounting of the teeth is simple and efficient and the particular disposition of the members 1 and 2 as above set forth is utilized. The rearmost ends of the teeth 10 are carried under and against the uppermost side C of the member 2 and in engagement with the inner face of the side D of the member 2, and are secured in place by a single bolt 11 extending through the side C and the end of the teeth, as shown. The teeth 10 rest on the upper surface of the side A of the member 2 and each tooth is secured in place thereon by means of a single bolt 12. Thus, replacement of a broken tooth is simply a matter of removing two bolts, 11 and 12, placing a new tooth in position and re-installing the bolts.

I have provided side skirts or walls on each side of my hay bucker which prevent spillage of hay picked up, the sides comprising an elongated wooden arm 13 extending outwardly in the same direction as the teeth 10 but above same, the arms 13 being mounted by means of vertical standards 14 and 15, respectively, on each of the front and rear corner of the chassis base.

To complete a rear wall for the device which will hold hay from passing over the rear end of the teeth 10 and to insure a compact accumulation of hay on the device, I have provided a framework of a plurality of strips 15 which are disposed vertically and in spaced relation to each other along the front face of the back wall of the chassis, the strips being joined or united by a pair of spaced, transversely disposed metallic members 16 and 17. The upper member 17 is located at the upper ends of the strips 15 and is pivotally connected to the members 4, 4 as by hinges 18 whereby the entire framework of strips 15, which comprises the effective rear wall of the device, may be pivoted or swung forwardly and upwardly to aid in removing hay from the device when it is desired to unload same. The forward and upward movement of the rear wall serves to roll and propel the hay towards the open front end of the device, and if the tractor is moved forwardly suddenly simultaneously with the pivotal raising of the rear wall, the hay will be removed quickly and completely from the device. A handle 19 is provided to permit the operator of the tractor to move the rear wall of the device as above described.

As means to hold hay in place on the bucker, I have provided a pair of hook-like arms 20, 20 which extend outwardly over the hay and hold same in place for transportation; however, the arms 20 are held upwardly out of the way of hay entering the bucker during the raking or picking-up operation by any suitable means, not shown.

My hay bucker is mounted on the rear end of the tractor 21 as shown in Figure 1, and the conventional power lift arms 22, one of which is shown, are utilized for controlling and adjusting the position of the device relative to the ground, the arms 22 being operatively connected, by means not shown, to power supplying means, usually hydraulic, of the tractor. In addition, the conventional lift arms 23, one of which is shown, of a tractor are employed, each of the lift arms 23 being joined with its corresponding arm 22 by a link arm 24 to be operated by and with the power arms.

The inner end of the lift arms are pivotally connected to the tractor as at 25, one on each side of the rear end housing thereof, and the link arms 24 are connected to the lift arms intermediate their ends, as shown, whereby the outer ends of the lift arms move farther than the outer ends of the power arms 22.

My hay bucker is connected to the outer ends of the lift arms 23 which have a hole therethrough to receive the bolt or pin 25' which also extends through the spaced holes 9, 9 in the lower ends of the extension members 51, 51 and the adjacent rear ends of the skid members 8—8. In addition, I have provided a V-shaped yoke 26 of flexible chain with each of the outer ends thereof attached to a lug 27, one of which lugs is mounted on each of the members 4, and the apex of the yoke being connected to the tractor itself as by an eye 28 on the axle housing of the tractor centrally between the wheels of the tractor and also centrally between the two lift arms 23. This mounting arrangement permits the raising and lowering of the hay bucker with respect to the ground and permits the efficient operation thereof under various operating conditions, as will become apparent.

In operation, the lift arms 23 are connected to the holes 9 of the hay bucker, and the yoke 26 is connected to the eye 28, the yoke being permanently installed on the bucker, as shown. The power arms 22 may then be operated to lift or raise the bucker out of its storage position on the ground, or in a barn or shed, as the case may be, so that the device may be easily and conveniently transported to the field or area where it is to be used. The bucker is on the rear end of the tractor, as shown, and is preferably carried in uppermost position, indicated in dotted lines at 30, during the transportation period. The storage position above referred to is the normal position of the device when not in use and when not connected to a tractor. The device will rest on the skids 8 and the ends of the teeth 10.

It will be noted that the bucker is raised arcuately to transporting position as the arms 23 are raised to elevated position because the yoke 26 is stretched tight, thereby causing the rear wall of the bucker to be inclined rearwardly and the teeth 10 to have their forward ends higher than their rearmost ends. Thus, an upwardly open V-shaped trough is formed in which hay may readily be carried for considerable distances without spilling and without interfering with the driver's vision.

When the hay raking or pick-up area is reached, the power lift may be operated to lower the bucker into normal operating position where the outer or leading ends of the teeth 10 rest on the ground so that they will slide under hay lying on the ground, as the hay is usually held slightly up from the ground by the stubble remaining when the hay is cut, making it easy for the bucker to sweep a field clean.

As may be readily seen in Figure 1, the angular position of the teeth 10 with relation to the ground may be varied from the position shown in solid lines at 31 and still the outer or leading ends of the teeth will rest in engagement with the ground. This feature is possible by the chain yoke 26. The yoke 26 maintains the bucker in a predetermined relation to the tractor as it is raised and lowered until the outer ends of the teeth 10 engage the ground, as is deemed apparent. However, if it is desired to reduce the angle of attack of the teeth, as when going up hill, the lift arms 23 may be lowered by the power lift mechanism and the rear end of the bucker will be moved closer to the ground. The yoke 26 becomes slack, as indicated in dotted lines at 32, and the bucker may be moved along as usual. Because the teeth are elongated wood strips and because of the particular mounting of the teeth, they are sufficiently flexible to ride over minor irregularities of the terrain traversed. Any desired level of the rear end of the bucker may be maintained by adjustment of the lift mechanism.

As may be seen, the arms 23 support the rear end of the bucker and also transmit the motive effort from the tractor to the bucker. The yoke 26 stabilizes the bucker at all times, preventing excessive lateral sway, and when the teeth 10 are not in engagement with the ground, it supports a part of the weight of the device.

The skids 8 are not intended to ride on the ground, but are to raise the bucker over any obstructions which might damage the lift or mounting mechanism.

It is to be understood that I have herein shown and described one specific embodiment of my invention, and that my appended claims are not necessarily limited specifically thereto, but should be construed as broadly as permissible in view of the prior art.

Having thus described my invention, what I claim is:

1. A hay bucker for attachment to the power lift arms of a tractor comprising: a chassis having a base and a rear frame member disposed in substantially vertical relation to said base, a plurality of spaced elongated teeth carried by said base and extending materially outwardly therefrom in substantial alinement with each other, a pair of extensions at the lower rear of said base, a connection at the lower end of each of said extensions to receive said lift arms whereby said bucker may be raised and lowered thereby, and a flexible V-shaped yoke having its opposed ends attached to said rear wall and its apex attached to said tractor, said yoke serving to control the position of said teeth with respect to the ground in accordance with the adjusted position of said arms, said extensions and connections being below said chassis and beyond the lower level of said teeth whereby said arms exert a force tending to lift the outer ends of said teeth when pushing said bucker in a direction toward the outer ends of said teeth thereby to prevent said teeth from digging into the terrain over which they travel.

2. A hay bucker for attachment to the power lift arms of a tractor comprising: a chassis having a base and a rear frame member disposed in substantially vertical relation to said base, a plurality of spaced elongated teeth carried by said base and extending materially outwardly therefrom, mounting members carried at the lower rear of said base and extending below said base, connecting means on said mounting members to receive said lift arms whereby said bucker may be raised and lowered thereby, and a flexible V-shaped yoke having its opposed ends attached to said rear frame above said base and its apex attached to said tractor, said yoke serving to control the position of said teeth with respect to the ground in accordance with the adjusted position of said arms, said mounting members and connecting means being below the plane of said teeth whereby force applied to said bucker during normal operation tends to lift the outer ends of said teeth upwardly from the terrain over which they travel.

3. The structure as set forth in claim 2 and a skid member extending at an upward and forward inclination from each of said mounting members to said base to carry said connecting means over obstructions.

References Cited in the file of this patent

UNITED STATES PATENTS

| Number | Name | Date |
|---|---|---|
| 1,652,350 | Duggan | Dec. 13, 1927 |
| 2,271,591 | Hickman | Feb. 3, 1942 |
| 2,479,753 | Luomala | Aug. 23, 1949 |
| 2,499,550 | Webb | Mar. 7, 1950 |